Feb. 12, 1957  A. W. KAMMERER, JR  2,780,830
PIN RETAINER
Filed June 20, 1955
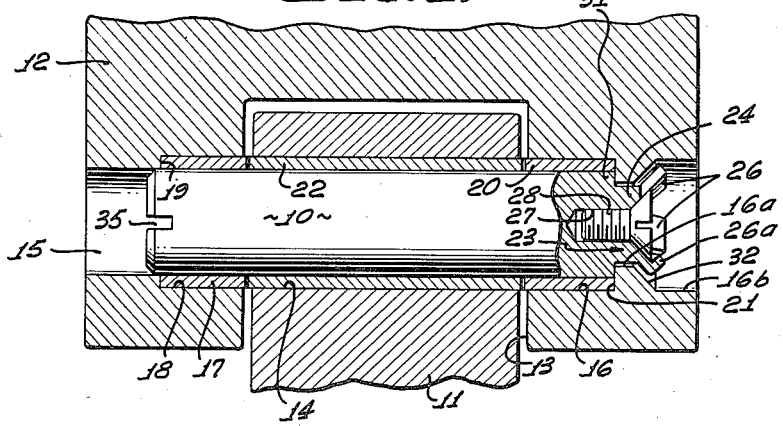
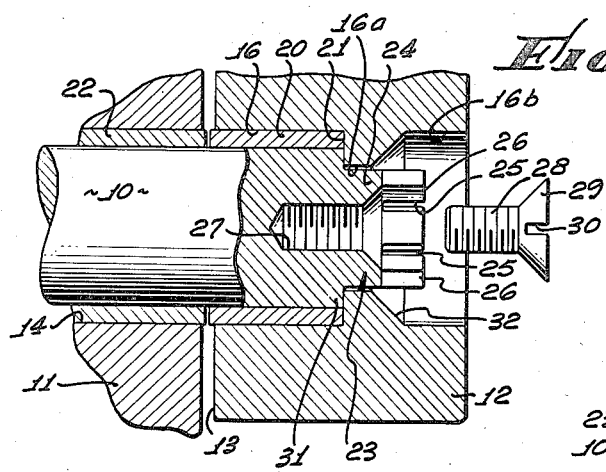
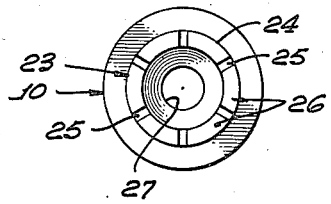
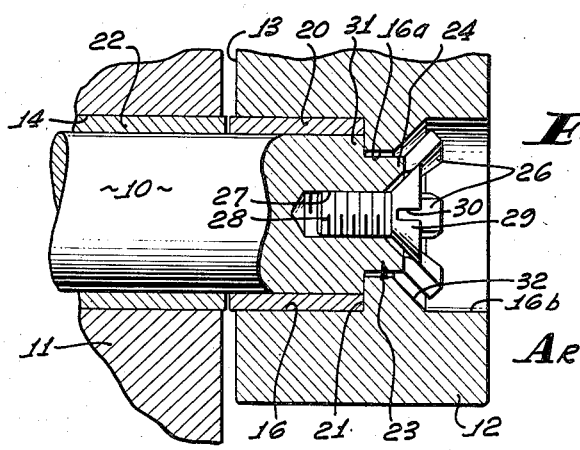
INVENTOR.
ARCHER W. KAMMERER, JR.
BY Bernard Kriegel
ATTORNEY.

2,780,830
PIN RETAINER

Archer W. Kammerer, Jr., Fullerton, Calif., assignor to Archer W. Kammerer, Fullerton, Calif.

Application June 20, 1955, Serial No. 516,429

8 Claims. (Cl. 16—169)

The present invention relates to devices for retaining hinge or connecting pins, and similar machine elements, in appropriate assembled relation with respect to other parts with which such pins or elements are associated.

An object of the present invention is to provide an improved manner of retaining a hinge pin and the like in proper assembled position with respect to other parts receiving the pin.

Another object of the invention is to provide a retainer device for a hinge pin and the like, which permits the hinge pin to be easily assembled and disassembled with respect to other associated parts, without inflicting any damage on such parts, and with assurance that the hinge pin will remain in place under severe load conditions.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through an embodiment of the invention, with the hinge pin retained in appropriate position;

Fig. 2 is an enlarged fragmentary section disclosing the hinge pin being assembled in place;

Fig. 3 is a view similar to Fig. 2 showing the hinge pin in completely assembled position;

Fig. 4 is an end view of the retainer end of the hinge pin prior to its being secured in position.

The invention is illustrated in the drawing as applied to a hinge pin 10 that is to pivotally secure a first member 11 to a second member 12. The first member may be pivotally mounted within a slot 13 in a second member upon the hinge pin 10 secured to the second member 12. As specifically shown in the drawings, the hinge pin 10 extends through a bore 14 in the first member and into bores 15, 16 in the second member 12 on each side of its slot 13. To minimize wear on the parts, the hinge pin 10 may operate within a bushing received within a counterbore 18 in the second member on one side of the slot, this bushing being prevented from moving laterally outward by engaging the body shoulder 19 forming the base of the counterbore. Similarly, a bushing 20 is provided around the other end portion of the pin within the second member bore 16, engaging a shoulder 21 that prevents the bushing 20 from moving outwardly of the second member. The central portion of the hinge pin also has a wear bushing 22 mounted thereon and having a working fit within the hole or bore 14 through the first member 11.

One end portion 23 of the hinge pin is reduced in diameter and has a central region removed to form a relatively short tubular section 24 provided with circumferentially spaced transverse slots 25 cut through its wall to produce a plurality of fingers 26. Opening into the tubular portion 24 is a threaded hole 27 in the pin 10 adapted to receive a screw 28 having a tapered head 29 as well as a slot 30 for the reception of a suitable screw driver (not shown). The end 31 of the pin adjacent the tubular portion 24 engages the second member shoulder 21, the tubular portion extending in an outward direction through the second member bore 16a adjacent such shoulder and projecting into an enlarged bore portion 16b opening to the exterior of the second member, the base 32 of this enlarged bore portion being tapered or inclined in an inward direction toward the body shoulder 21.

The bushings 17, 20, 22 are inserted in place and the first member 11 disposed in the second member slot 13 with its bushing 22 in alignment with the other bushings 17, 20. The cylindrical pin 10 is then inserted through one of the transverse bores 15 in the second member 12 and through the bushings until its end portion 31 engages the second member shoulder 21, with the fingers 26 of the pin disposed in the enlarged counterbore 16b (as shown in Fig. 2).

The fingers 26 are then bent outwardly through use of a suitable tool (not shown) to lie against the tapered shoulder 32. Such engagement of the fingers 26 with the tapered shoulder 32 prevents axial movement of the pin 10 in one direction, whereas engagement of the pin end 31 with the other shoulder 21 prevents its axial movement in the opposite direction.

The fingers 26 are prevented from being inadvertently retracted by threading the screw 28 into the threaded bore 27 in the pin, the tapered head 29 on the screw engaging the outwardly bent fingers 26 to hold them against the shoulder 32 (Figs. 1 and 3). To facilitate insertion of the screw 28, the other end of the cylindrical pin 10 may be provided with a screw driver slot 35 to receive a screw driver to prevent the pin from rotating during the threading of the screw 28 in the threaded bore 27. Once the screw 28 has been assembled in this manner, it can be prevented from inadvertently loosening by bending one of the fingers 26a back over against the head portion 29 of the screw.

In the event it is desired to withdraw the pin 10 from its assembled position, the finger 26a bent against the head 29 of the screw is forced laterally outward, the screw 28 removed, and the fingers 26 all bent inwardly sufficiently to pass through the small diameter bore portion 16a of the member 12, which allows the pin 10 to be withdrawn from the second member through the opposite bore portion 15 of the latter. With the removal of the hinge pin 10, the first member 11 can be withdrawn from the second member slot 13.

In the event the parts are to be reassembled, the foregoing procedure as to the assembly of the device is repeated, the fingers 26 being disposed sufficiently inward as to pass through the small diameter portion 16a of the second member bore to place the pin shoulder 31 against the second member shoulder 21, substantially as disclosed in Fig. 2. The fingers 26 are then bent outwardly once again, the screw 28 inserted in place, and the screw retaining finger 26a bent back over against the head portion 29 of the screw, as in Figs. 1 and 3.

It is, accordingly, apparent that a relatively simple retainer device has been provided for preventing axial movement of the hinge pin 10 in both directions. The retainer portion is built into the hinge pin itself, in view of the ability of the fingers 26 to be bent outwardly against the tapered shoulder 32 of the second member 12. The screw 28 precludes inadvertent inward bending of the fingers 26, insuring their retention in snug engagement with the tapered shoulder 32.

The inventor claims:

1. In apparatus of the character described: a first member having a bore; a second member; a pin mounted on said second member and extending into said bore; coengageable shoulders on said first member and pin to prevent axial movement of said pin in said bore in one direction; said first member having another shoulder surrounding said bore; said pin having fingers adapted to be bent outwardly into engagement with said another shoulder to prevent axial movement of said pin in the opposite direction; and means secured to said pin and engaging said fingers to hold them in their outward position and retain them in engagement with said another shoulder.

2. In apparatus of the character described: a first member having a bore; a second member; a pin mounted on said second member and extending into said bore; coengageable shoulders on said first member and pin to prevent axial movement of said pin in said bore in one direction; said first member having another shoulder surrounding said bore; said pin having fingers adapted to be bent outwardly into engagement with said another shoulder to prevent axial movement of said pin in the opposite direction; said pin having a threaded bore; and a screw threaded into said threaded bore and engaging said fingers to retain them in engagement with said another shoulder.

3. In apparatus of the character described: a first member having a bore, a portion of said member projecting into said bore to provide a restricted passage and oppositely facing shoulders on opposite sides of said passage; a second member; a pin mounted on said second member end extending into said bore; said pin having a reduced diameter portion extending through said passage to provide a pin shoulder engaging one of said first member shoulders; said reduced diameter portion having fingers adapted to be bent outwardly into engagement with the other of said first member shoulders; and means secured to said pin and engaging said fingers to hold them in their outward position and retain them in engagement with said other of said first member shoulders.

4. In apparatus of the character described: a first member having a bore, a portion of said member projecting into said bore to provide a restricted passage and oppositely facing shoulders on opposite sides of said passage; a second member; a pin mounted on said second member and extending into said bore; said pin having a reduced diameter tubular portion extending through said passage to provide a pin shoulder engaging one of said first member shoulders; said tubular portion having end slots to provide fingers adapted to be bent outwardly into engagement with the other of said first member shoulders; the bore of said tubular portion being threaded; and a screw threaded into said tubular portion bore and engaging said fingers to retain them in engagement with said other of said first member shoulders.

5. In apparatus of the character described: a first member having a bore, a portion of said member projecting into said bore to provide a restricted passage and oppositely facing shoulders on opposite sides of said passage; a second member; a pin mounted on said second member and extending into said bore; said pin having a reduced diameter tubular portion extending through said passage to provide a pin shoulder engaging one of said first member shoulders; the other of said first member shoulders being tapered inwardly in a direction toward said first-mentioned shoulder; said tubular portion having end slots to provide fingers adapted to be bent outwardly into engagement with said tapered shoulder; the bore of said tubular portion being threaded; a screw threaded into said tubular portion, said screw having a tapered head engaging said fingers to retain them in engagement with said tapered shoulder.

6. In apparatus as defined in claim 5; wherein one of said fingers is bent inwardly over the screw head to prevent unthreading of the screw from said tubular portion bore.

7. In apparatus of the character described: a first member having a bore; a second member; a pin mounted on said second member and extending into said bore; coengageable shoulders on said first member and pin to prevent axial movement of said pin in said bore in one direction; said first member having another shoulder surrounding said bore; said pin having fingers adapted to be bent outwardly into engagement with said another shoulder to prevent axial movement of said pin in the opposite direction; and means disposed between and engaging said fingers to prevent their inward movement from engagement with said another shoulder.

8. In apparatus of the character described: a first member having a bore, a portion of said member projecting into said bore to provide a restricted passage and oppositely facing shoulders on opposite sides of said passage; a second member; a pin mounted on said second member and extending into said bore; said pin having a reduced diameter portion extending through said passage to provide a pin shoulder engaging one of said first member shoulders; said reduced diameter portion having fingers adapted to be bent outwardly into engagement with the other of said first member shoulders; and means disposed between and engaging said fingers to prevent their inward movement from engagement with said other of said first member shoulders.

References Cited in the file of this patent
UNITED STATES PATENTS
1,208,422   Way   Dec. 12, 1916